ns Patent [19]           [11] 3,859,255
Heer et al.                                  [45] Jan. 7, 1975

[54] METHYLOLGLYCIDYL ETHERS OF POLYVALENT PHENOL ETHERS

[76] Inventors: Alfred Heer, Am Stausee 25, Birsfelden; Alfred Renner, Entenweidstrasse 18, Muenchenstein, both of Switzerland

[22] Filed: Apr. 27, 1972

[21] Appl. No.: 248,279

[30] Foreign Application Priority Data
May 18, 1971  Switzerland.......................... 7282/71

[52] U.S. Cl.... 260/51 EP, 117/161 ZB, 260/47 EP, 260/47 EN, 260/47 EC, 260/348 C, 260/830 TW
[51] Int. Cl............................................ C08g 30/14
[58] Field of Search........ 260/47 EP, 51 EP, 613 R, 260/348 C

[56] References Cited
UNITED STATES PATENTS
2,579,329   12/1951   Martin .............................. 260/51 X Primary Examiner—William H. Short
Assistant Examiner—T. Pertilla
Attorney, Agent, or Firm—Karl F. Jorda

[57] ABSTRACT

The invention relates to liquid epoxide resins from binuclear polyvalent phenols of which the phenol groups are etherified, and which contain at least 2 glycidyloxymethyl groups. After being cured, these resins form the material of chemically resistant products having good mechanical properties.

14 Claims, No Drawings

METHYLOLGLYCIDYL ETHERS OF POLYVALENT PHENOL ETHERS

Polynuclear phenols such as bisphenol A, or novolaks, are the most frequently employed starting products for the production of the epoxide resins commonly in use at the present time. Carbonyl compounds such as acetone, formaldehyde, glyoxal and acrolein serve to effect the linkage of phenols with retention of the phenolic hydroxyl group. Etherification of this group with epichlorohydrin and sodium hydroxide solution then yields the above mentioned epoxide resins. Solid and liquid epoxide resins can be produced in this manner. Unmodified epoxide resins liquid at room temperature prepared from polyvalent phenols generally contain at most 2 glycidyl ether groups per molecule, whereas those containing more than two glycidyl ether groups per molecule are normally very highly viscous or solid at room temperature. Only curing agents having more than two reactive hydrogen atoms per molecule are suitable for the cross-linking ("curing") of epoxide resins having two or less epoxide groups per molecule.

There exists, however, a great need, e.g. in the case of products for surface protection, for bonds, etc., for epoxide resins liquid at room temperature having more than two epoxide groups per molecule. On the one hand, it is possible to obtain with such resins, with use of the usual curing agents, a better cross-linking, and hence a higher resistance of coatings, moulded products or adhesives to the effects of chemicals; and, on the other hand, such resins can be cured also with curing agents containing only two reactive hydrogen atoms per molecule, e.g. with dimercapto compounds, or with dicarboxylic acids.

It has now been shown that certain epoxide resins from polyvalent phenols of which the phenol groups are etherified, and which contain glycidyloxymethyl groups, constitute resins which are liquid at room temperature, and which lead to products possessing excellent mechanical properties and high resistance to chemical action.

The new methylolglycidyl ethers according to the invention correspond to formula I:

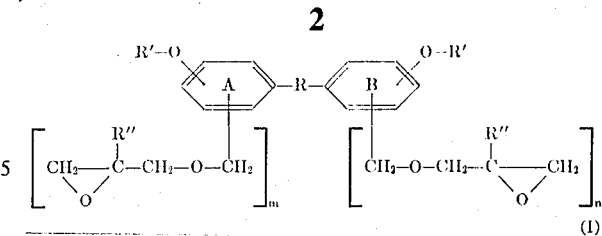

(I)

wherein
R represents an alkylene or alkenylene group optionally substituted by glycidyl ether groups, or the sulphonyl group,
R' represents an alkyl, alkenyl, cycloalkyl, cycloalkenyl or aralkyl group optionally interrupted by oxygen atoms, or containing oxygen-containing substituents or halogen, and having 1 to 12 carbon atoms in the aliphatic radical, or a methylglycidyloxyalkyl or glycidyloxyalkyl group having 1-4 carbon atoms in the alkyl group,
R'' represents hydrogen or the methyl group, and $m$ and $n$ each stand for 0, 1 or 2, whereby
  a. the partial molecular weight of R' is smaller than 250,
  b. the sum of $m + n$ is at least 1, and in this case R' represents a methylglycidyloxyalkyl or glycidyloxyalkyl group,
  c. the benzene nuclei A and B can, in addition, be substituted by alkyl or alkenyl groups optionally containing glycidyl ether groups and having at most 12 carbon atoms, or by halogen, and
  d. the methylglycidyloxymethyl or glycidyloxymethyl groups are in o- or p-position to the etherified phenolic hydroxyl groups.

Particularly important are methylolglycidyl ethers 2-ehyl, R in formula I represents an alkyl group having 1 to 4 carbon atoms, such as the 2,2-propylidene group, the sulphonyl group or the 1,1-prop-2-enylidine group, and the etherified phenolic groups are in the p-position with respect to R; also methylolgylcidyl ethers of formula I wherein R' stands for the methyl, the prop-2the methoxyethyl or the glycidyloxyethyl group. The compounds preferably contain at least 3 glycidyl groups.

Typical epoxide resins according to the invention correspond to the following structural formulae:

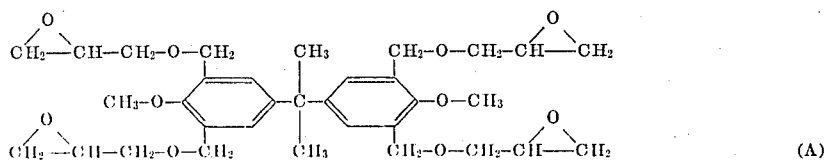
(A)

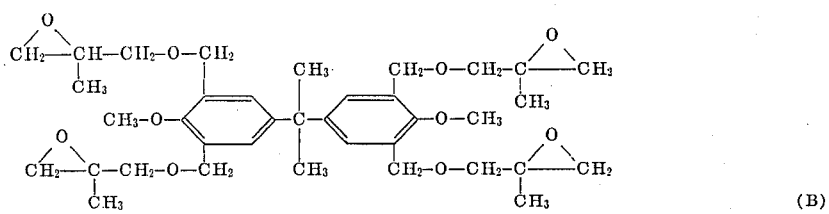
(B)

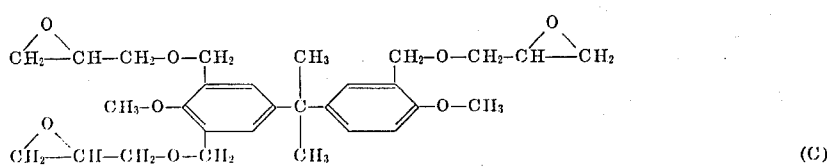
(C)

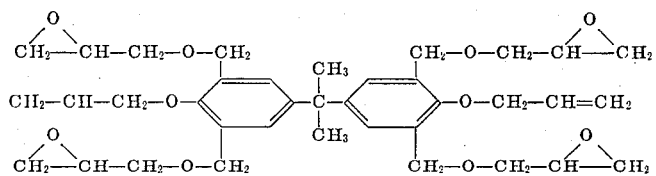
(D)
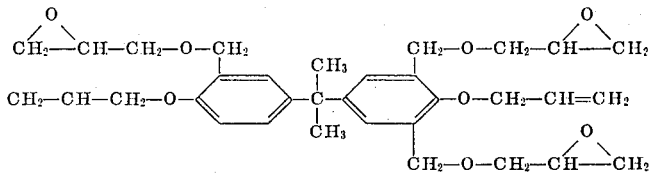
(E)
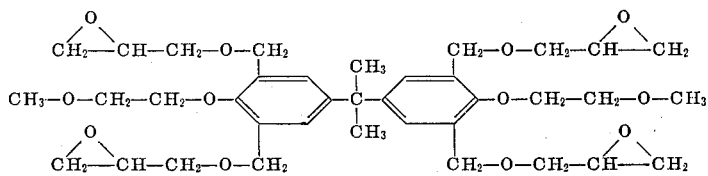
(F)
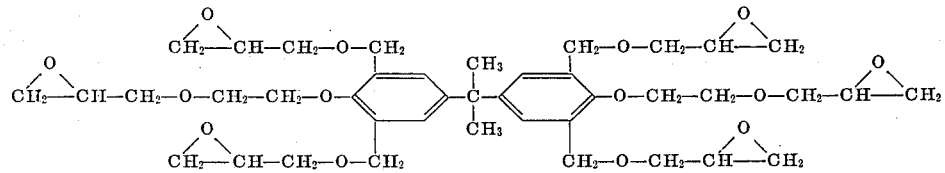
(G)
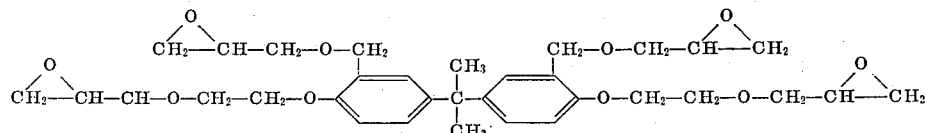
(H)
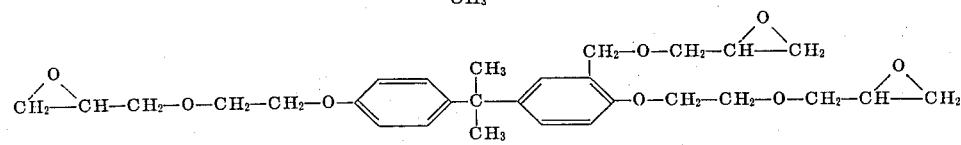
(J)
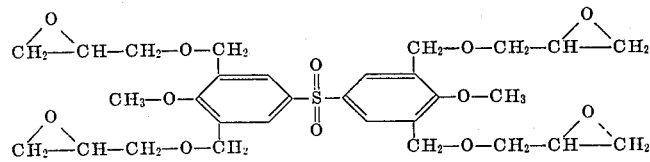
(K)
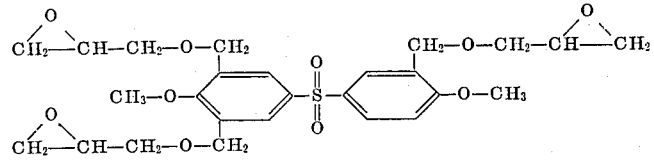
(L)
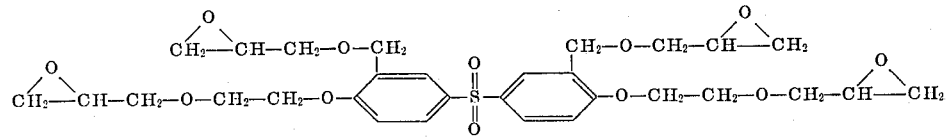
(M)
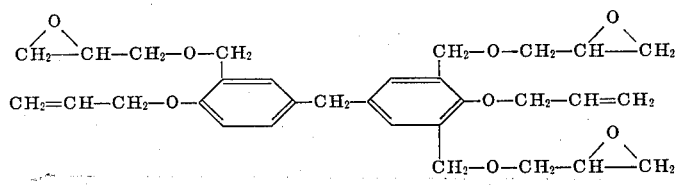
(N)

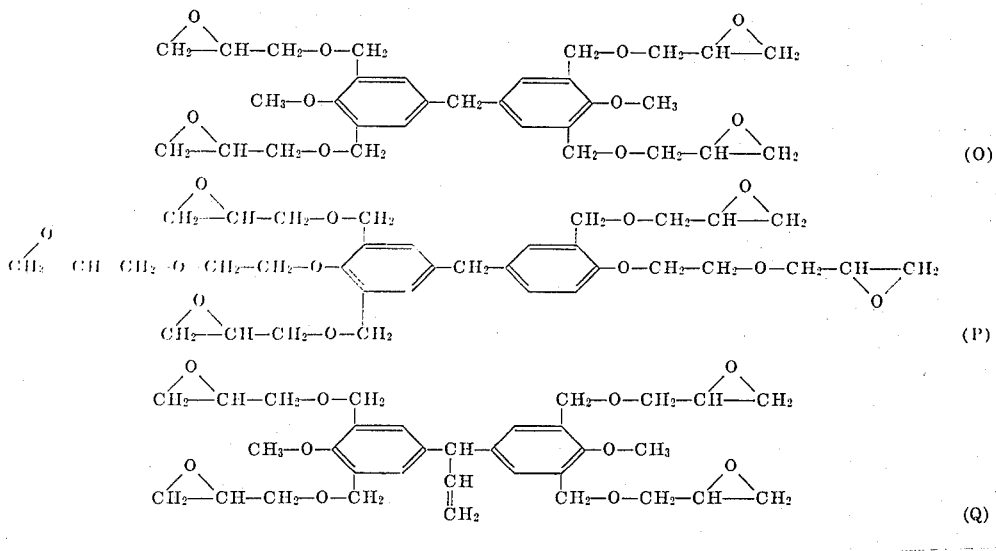

(O)

(P)

(Q)

The methylolglycidyl ethers of formula I are obtained according to the invention by a process in which phenol ethers containing methylol groups and corresponding to formula II:

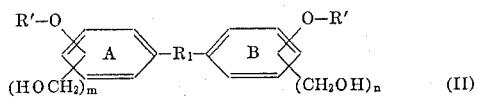

wherein $R_1$ represents an alkylene or alkenylene group optionally substituted by hydroxyl groups, or the sulphonyl group, and the benzene nuclei A and B can, in addition, be substituted by alkyl or alkenyl groups optionally containing hydroxyl groups and having at most 12 carbon atoms, or by halogen, are glycidylated with epihalohydrin or with methylepihalohydrin, with azeotropic removal of the water formed during the reaction.

The glycidylation of the hydroxyl groups is performed with azeotropic distillation, preferably in a circulation system through a water separator, and in the presence of a catalyst and a hydrogen chloride acceptor. Preferably, 2 to 10 moles of epichlorohydrin are used for each hydroxyl equivalent.

Suitable catalysts are quaternary ammonium halides such as, e.g. tetramethylammonium chloride, tetraethylammonium bromide, or benzyltrimethylammonium chloride.

A suitable hydrogen chloride acceptor is, e.g. alkali hydroxide, most simply sodium hydroxide, in an equivalent amount, or in a slight excess (up to 20%), relative to the hydroxyl groups. Higher excess amounts lead to saponification of epichlorohydrin, and to contamination of the final product with polyglycerin. Advantageously, the sodium hydroxide solution is added as a concentrated aqueous solution during the azeotropic removal of water under reduced pressure. Water which is added with the sodium hydroxide solution, and water formed during the reaction, is continuously removed in this manner from the reaction mixture. The sodium chloride formed during glycidylation can, in the course of processing, be either washed out or removed by centrifuging. After removal of the sodium chloride, the excess epichlorohydrin is distilled off, optionally under vacuum. The reaction products remain behind as viscous, liquid resins which are light-yellow to yellow-brown in colour, and which do not crystallise even after a long period of standing.

The starting products of the process according to the invention can be produced by reacting one mole of a bisphenol with 1 to 4 moles of formaldehyde in an alkaline medium, the reaction being performed so carefully that the formation of polycondensation products is avoided to the greatest possible extent. The thus obtained sodium-hydroxymethylphenolates, or mixtures thereof, are reacted, in a known manner, with suitable organic halogen compounds, or with organic sulphates, sulphites, sulphonates or carbonates. The thus obtained hydroxymethyl-bis-phenol ethers are reacted, optionally without prior isolation, with epichlorohydrin in excess and with alkali metal hydroxide, the reaction being so arranged that the water introduced into the reaction mixture, and that forming during the process, is removed by azeotropic distillation, optionally under reduced pressure. The presence of a catalyst, e.g. a tetraalkylammonium halide, is of advantage.

The employed polynuclear polyphenols must not be substituted in the o- or p-position, relative to the phenolic hydroxyl groups. Examples of particularly suitable polynuclear polyphenols are: 2,2-bis-(p-hydroxyphenol)-propane (= bisphenol A), 4,4'-dihydroxydiphenylsulphone (= bisphenol S), 4,4'-dihydroxydiphenylmethane, and 1,1-bis-(p-hydroxyphenyl)-propene(2). Formaldehyde is added advantageously in the form of a 30 or 37 per cent by weight aqueous solution. The alkali hydroxide best used is sodium hydroxide in concentrated aqueous solution. For the formation of the hydroxymethylbisphenol, the amount generally sufficing is such that the pH-value of the reaction mixture can be adjusted to at least 8. For the subsequent reaction of the hydroxymethyl-bisphenol with organic halides or sulphates, however, an equivalent amount of sodium hydroxide solution is necessary. The most simple procedure, therefore, is to employ when the formaldehyde addition is made an amount of sodium hydroxide solution equivalent to the phenolic hydroxyl groups. Methylolation is performed in the temperature range of between 20° and 100°C, preferably at about 60°C. If there is not a complete methylolation of all free o- and p-positions, then, in general, mixtures of position-isomeric hydroxymethyl compounds methylolated to varying degrees are obtained.

Examples of suitable reagents for the reaction with hydroxymethyl-bis-sodium phenolates are: ethylenechlorohydrin, ethylenebromohydrin, allyl chloride, allyl bromide, methallyl chloride, crotyl chloride, crotyl bromide [= 1-bromobutene(2)], ethylenesulphite, ethylene carbonate, dimethylsulphate, diethylsulphate, benzyl chloride, furfuryl chloride, ethylene chlorohydrinmethyl ether, epichlorohydrin, also polyethylene and polypropylene oxides with terminal bromine or chlorine.

The mentioned compounds can in most cases be simply reacted with aqueous solutions of the hydroxymethyl-bissodium phenolates; in some cases, however, organic solvents, such as isopropanol or butanol, are to be preferred. It is advantageous to perform the etherification reaction under the mildest possible conditions, in order to avoid a cross-linking by polycondensation of the hydroxymethyl groups.

The etherification of the phenolic hydroxyl groups can also be carried out in such a way that aliphatic hydroxyl groups are introduced into the molecule. These are then likewise glycidylated simultaneously with the methylol groups.

After etherification of the phenolic hydroxyl groups, the reactivity of the methylol groups is so greatly reduced that glycidylation can be carried out in the usual manner without risk of resinification or cross-linking. For this purpose, the ether is taken up in epichlorohydrin or in methyl epichlorohydrin, and the epichlorohydrin solution separated from the overlying aqueous salt solution.

The methylolglycidyl ethers according to the invention can be converted into the insoluble and unmeltable state with carboxylic acid anhydrides, or with compounds containing two or more reactive hydrogen atoms per molecule, such as polyamines, polythiols, polyphenols or polycarboxylic acids, optionally with the action of heat.

Anionic polymerisation catalysts too, e.g. borofluoride and its complexes, or cationic polymerisation catalysts, e.g. tertiary amines, are suitable for curing. The compounds according to the invention prove to be more reactive towards most of the stated curing agents than the glycidyl ethers of polyvalent phenols, such as resorcin, bisphenol A, or of novolaks. The high reactivity, combined with excellent mechanical properties after curing, renders these resins particularly suitable for use as lacquer resins, casting resins, dipping and impregnating resins, as well as for bonding. By virtue of the high reaction capacity of the said resins, a high cross-linking density after curing with suitable curing agents can be obtained. It is therefore possible to obtain with cycloaliphatic or aliphatic polyamines, coatings and layers having excellent resistance to chemicals.

The polyvalency of the epoxide resins according to the invention is of advantage particularly moreover in the case of cross-linking with curing agents containing only two active hydrogen atoms per molecule; for example, in the case of curing with mercapto compounds, polyphenols or dicarboxylic acids. No actual cross-linking can be obtained with the diglycidyl ether of bisphenol A with bifunctional curing agents, whereas the resins according to the invention can be cured with such curing agents to produce cross-linked moulded articles.

Examples of such curing agents are primary aliphatic monoamines such as butylamine, also benzylamine, aniline, as well as compounds having two mercapto groups, such as ethanedithiol, 2,2'-dimercapto-diethyl ether, or the trimethyladipic acid/isomer mixture liquid at room temperature.

The products according to the invention are suitable — optionally after conversion into meltable polyadducts by partial reaction with curing agents — also as the resin components for moulding mixtures, layer materials, whirl sinter powders and bonding agents. In accordance with the intended purpose of application, the said products can be combined with other epoxide resins based on polyvalent phenols, or with aliphatic, cycloaliphatic or heterocyclic epoxide resins. Addition to liquid bisphenol A epoxide resins produces an appreciable lowering of the crystallisation tendency without significantly affecting the other properties. Used with mercapto curing agents such as dimercaptoethyl ether, the products can be applied for bonding. Chemically very resistant coatings can be obtained particularly with products cured with polyamines. Moulded articles resistant to aging at elevated temperature are obtained by hot curing of tetraglycidyl compounds containing a sulphonyl group with bisphenol A or bisphenol S.

EXAMPLE 1 (cp. formula D)

An amount of 5.93 kg of bisphenol A (26 moles) is placed with 20.8 kg of water into a 60 litre vessel with stirrer; whilst vigorous stirring is maintained, 4.16 kg (52 moles) of aqueous 50% sodium hydroxide solution are then added. The obtained solution of bisphenol A - disodium salt is heated to 60°C. An addition is made to the solution in the course of 30 minutes of 10.4 kg of 30% aqueous formaldehyde solution (104 moles); the mixture is held for a further hour at 60°C, and afterwards cooled to 45°C. An amount of 4.0 kg of allyl chloride (52 moles) is then added dropwise in such a manner that slight refluxing occurs at ca. 45°C. After this addition, the reaction mixture is maintained for 5 hours at 50°C, and an addition of 34.5 kg of epichlorohydrin is then made. The aqueous phase is subsequently separated in a separating vessel, and extracted with 4 kg of epichlorohydrin. The combined epichlorohydrin solutions are returned to the reaction vessel, and an amount of 0.25 of tetramethylammonium chloride is added. The residual water is removed from the reaction mixture by circulation distillation through a water separator under a partial vacuum of about 70 Torr. In the course of 3 hours, an amount of 9.36 kg of aqueous 50% sodium hydroxide solution (117 moles) is then added dropwise, and simultaneously, by circulation distillation through a water separator under partial vacuum at 50–60°C, the introduced water and that formed during the reaction removed.

An amount of 15 kg of water is subsequently added to the mixture, in order to dissolve the formed sodium chloride. After separation of the salt solution, the organic phase is washed again this time with 10 kg of water, and the excess epichlorohydrin subsequently distilled off under vacuum. A residue of 15 kg of liquid resin (88.4% of theory) is obtained having the following properties:

| | |
|---|---|
| content of epoxide groups : | 5.4 equivalents/kg (theory: 6.13) |
| colour number according to Gardner-Holdt : | 2–3 |
| viscosity at 25°C (Hoeppler) : | 28,000 Centipoise |
| chlorine content according to Wurzschmitt : | 0.4 % |
| saponifiable chlorine content : | <0.1 % |

In combination with mercapto curing agents such as 2,2'-dimercapto-diethyl ether, the resin is suitable for producing bonds or joints rapidly curing in the cold state; and with polyamine curing agents, the said resin is suitable for the production of coatings resistant to chemicals.

Example 2 (cp. formula E)

The sodium salt is produced from 5.93 kg of bisphenol A (26 moles), in the same manner as described in Example 1;
it is first reacted with 7.8 kg of 30% aqueous formaldehyde solution (78 moles), and then with 4.0 kg (52 moles) of allyl chloride. The methylol compound is dissolved with 34.5 kg of epichlorohydrin, and converted with 7.0 kg of aqueous 50% sodium hydroxide solution (87.5 moles) into the corresponding polyglycidyl compound. An amount of 14 kg (95% of theory of liquid resin having the following properties is obtained:

| | |
|---|---|
| content of epoxide groups : | 4.8 equivalents/kg (theory: 5.3) |
| colour number according to Gardner-Holdt : | 2–3 |
| viscosity at 25°C (Hoeppler) : | 18,000 Centipoise |
| chlorine content according to Wurzschmitt : | 0.5 % |
| saponifiable chlorine content : | <0.1 % |

Chemically resistant coatings are obtained with the resin after curing with 4,4'-diaminodicyclohexyldimethylmethane.

EXAMPLE 3 (cp. formula A)

An amount of 5.02 kg of bisphenol A (22 moles) is placed with 17.6 kg of water into a suitable reaction vessel; a further addition is then made, with thorough stirring, of 3.52 kg (44 moles) of 50% aqueous sodium hydroxide solution. There is formed a clear solution at 60°C; and, in the course of 30 minutes, an amount of 9.7 kg of 30% aqueous formaldehyde solution is then introduced. The mixture is subsequently maintained for one hour at 60°C, and then cooled to 50°C. An addition is thereupon made dropwise, within 1 hour and at 50°C, of 5.55 kg (44 moles) of dimethylsulphate; the mixture is afterwards cooled to 25°C. The pH-value of the reaction mixture is measured; at the commencement of the addition the value is 10.5 – 11.0, and at the end of the addition 9.0 – 10.0. Stirring is continued at 25°C until there is no further decrease in the pH-value (ca, 2–3 hours, the pH-value is then ca. 3.5); the mixture is then neutralised to pH 8 with 20% sodium hydroxide solution (consumption ca. 300 ml), and an amount of 33 kg (356 moles) of epichlorohydrin added.

The aqueous phase is subsequently separated in a separating vessel from the epichlorohydrin solution.

In the same manner as that described in Example 1, the methylol groups are glycidylated with 7.75 kg (97 moles) of 50% sodium hydroxide solution in the presence of 0.2 kg of tetramethylammonium chloride.

After processing, an amount of 12 kg of liquid viscous resin (91% of theory) is obtained having the following properties:

| | |
|---|---|
| content of epoxide groups : | 5.9 equivalents per kg (theory: 6.66) |
| colour number according to Gardner-Holdt : | 3–4 |
| viscosity at 40°C (Hoeppler) : | 24,000 Centipoise |
| chlorine content according to Wurzschmitt : | 0.3 % |
| saponifiable chlorine content | <0.1 % |

The resin can be employed as described in Example 1.

EXAMPLE 4 (cp. formulae A and C, mixture)

In the same manner as that described in Example 3, the disodium salt from 502 g of bisphenol A (2.2 moles) and 352 g of 50% sodium hydroxide solution is reacted with 726 g of 30% aqueous formaldehyde solution (7.26 moles) and 555 g (4.4 moles) of dimethylsulphate. The methylol compound is subsequently dissolved in 3000 g of epichlorohydrin, and converted with 640 g of aqueous 50% sodium hydroxide solution (8 moles), in the presence of 25 g of tetramethylammonium chloride, into the corresponding polyglycidyl compound. An amount of 1100 g of liquid medium viscous resin (92.5% of theory) having the following properties is obtained:

| | |
|---|---|
| content of epoxide groups : | 5.6 equivalents per kg (theory: 6.11) |
| colour number according to Gardner-Holdt : | 3 |
| viscosity at 25°C (Hoeppler) : | 26,000 Centipoise |
| chlorine content according to Wurzschmitt : | 0.4% |
| saponifiable chlorine content : | <0.1% |

The resin can be employed in the manner described in Example 1.

EXAMPLE 5 (cp. formula L)

An amount of 320 g (4 moles) of aqueous 50% sodium hydroxide solution is added to 500 g (2 moles) of 4,4'-dihydroxy-diphenylsulphone (= "bisphenol S") and 2000 g of water; the whole is heated to 60°C and stirred with a high-speed stirrer, a clear solution being thus obtained. In the course of 60 minutes, an addition is made dropwise of 600 g of 30% aqueous formaldehyde solution (6moles); the reaction mixture is then stirred for 90 minutes at 60°C, and afterwards cooled to 50°C. Whilst the pH-value is being checked, an amount of 508 g (4 moles) of dimethylsulphate is added dropwise in 90 minutes at 50°C; stirring in then continued at 35°C until the pH-value no longer decreases (at pH~3.5). The pH-value is adjusted to 8 with 10% aqueous sodium hydroxide solution (consumption ca. 50 ml), and 3 kg of epichlorohydrin added. After 5 minutes' stirring, the reaction mixture is allowed to stand until phase separation occurs, and the aqueous phase then separated. In the same manner as in Example 1, glycidylation is performed with 528 g (6.6 moles) of aqueous sodium hydroxide solution in the presence of 20 g of tetramethylammonium chloride.

After completion of processing, an amount of 940 g (87.6% of theory) of resin, soft and sticky at room temperature, was obtained having the following properties:

| | |
|---|---|
| content of epoxide groups : | 5.0 equivalents per kg (theory: 5.6) |
| colour number according to Gardner-Holdt : | 4 |
| viscosity at 60°C (Hoeppler) : | 22,000 Centipoise |
| chlorine content according to Wurzschmitt : | 0.8 % |
| content of saponifiable chlorine : | <0.1 % |

The resin is suitable for the production of chemically resistant coatings, and of moulded articles resistant to heat aging.

EXAMPLE 6 (cp formula H)

An amount of 5.7 kg of bisphenol A (25 moles) is placed with 20 kg of water into a 60 litre stainless steel vessel with stirrer; whilst thorough stirring is maintained, 4 kg (50 moles) of aqueous 50% sodium hydroxide solution are then introduced. An addition is subsequently made to the clear solution at 60°C, in the course of 45 minutes, of 5 kg (50 moles) of 30% aqueous formaldehyde solution; and, to promote further reaction, stirring is continued for 90 minutes at 60°C. An amount of 4025 g (50 moles) of ethylenechlorohydrin is added at 50°C; and, after 5 hours at 50°C, 37 kg of epichlorohydrin are introduced, stirring continuing for a further 5 minutes. The reaction mixture is then allowed to stand until the phases separate, and the epichlorohydrin solution then separated from the aqueous salt solution. In the same manner as in Example 1, glycidylation is performed with 9 kg (112.5 moles) of aqueous 50% sodium hydroxide solution in the presence of 250 g of tetramethylammonium chloride, with both the methylol groups and the hydroxyethyl groups being reacted. After processing, and amount of 12.8 kg (85% of theory) of liquid resin having the following properties is obtained:

| | |
|---|---|
| content of epoxide groups : | 6.0 equivalents per kg (theory: 6.66) |
| colour number according to Gardner-Holdt : | 2 |
| viscosity at 25°C (Hoeppler) : | 14,000 Centipoise |
| chlorine content according to Wurzschmitt : | 0.4 % |
| content of saponifiable chlorine : | <0.1 % |

The resin can be used as described in Example 1.

EXAMPLE 7 (cp. formula J)

In the same manner as described in Example 6, the disodium salt from 5.7 kg of bisphenol A (25 moles) and 4 kg of sodium hydroxide solution (50%) is reacted with 2.5 kg (25 moles) of aqueous 30% formaldehyde solution and 4025 g (50 moles) of ethylenechlorohydrin. The reaction product is dissolved in 35 kg of epichlorohydrin, and converted with 6.6 kg (82.5 moles) of aqueous 50% sodium hydroxide solution, in the presence of 220 g of tetramethylammonium chloride, into the corresponding polyglycidyl compound, with both the methylol groups and the hydroxyethyl groups reacting. An amount of 11.1 kg (86% of theory) of liquid, medium viscous resin having the following properties is obtained:

| | |
|---|---|
| content of epoxide groups : | 5.3 equivalents per kg (theory: 5.83) |
| colour number according to Gardner-Holdt : | 1-2 |
| viscosity at 25°C (Hoeppler) : | 7,000 Centipoise |
| chlorine content according to Wurzschmitt : | 0.3 % |
| content of saponifiable chlorine: | 0.1 % |

The resin is suitable for the product of coatings resistant to chemicals if it is cured with a polyamine.

EXAMPLE 8 (cp. formula F)

In the same manner as described in Example 1, the disodium salt is produced from 228 g of bisphenol A (1 mole); it is reacted first with 400 g of 30% aqueous formaldehyde solution (4 moles) and then with 189 g (2 moles) of ethylenechlorohydrin-methyl ether (= 1-chloroethyl-methyl ether). The methylol compound is dissolved in 1800 g of epichlorohydrin, the epichlorohydrin solution separated from the aqueous salt solution, and converted with 352 g of aqueous sodium hydroxide solution (50%) (4,4 moles) into the corresponding polyglycidyl compound. An amount of 586 g (85% of theory) of liquid resin having the following properties is obtained:

| | |
|---|---|
| content of epoxide groups : | 5.1 equivalents per kg (theory: 5.8) |
| colour number according to Gardner-Holdt : | 2-3 |
| viscosity at 25°C (Hoeppler) : | 15,000 Centipoise |
| chlorine content according to Wurzschmitt : | 0.5 % |
| saponifiable chlorine content : | <0.1 % |

The resin can be employed as described in Example 1, or cured with the stoichiometric amount of bisphenol A to obtain moulded articles resistant to heat aging.

We claim:

1. A Methylolglycidyl ether of formula I:

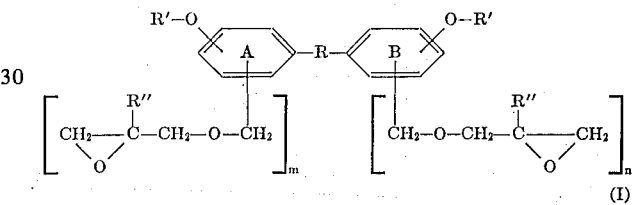

wherein
R represents an alkylene or alkenylene group optionally substituted by glycidyl ether groups, or a sulphonyl group,
R' represents an alkyl, or alkenyl, optionally interrupted by oxygen atoms, or containing oxygen-containing substituents, and having 1 to 12 carbon atoms in the aliphatic radical, or a methyl-glycidyloxyalkyl or glycidyloxyalkyl group having 1-4 carbon atoms in the alkyl group,
R'' represents hydrogen or the methyl group, and $m$ and $n$ each stand for 0, 1 or 2, whereby
a. the partial molecular weight of R' is smaller than 250,
b. the sum of $m + n$ is at least 1, and in the case where $m + n = 1$, R' represents a methyl-glycidyloxylakyl or glycidyloxyalkyl group,
c. the benzene nuclei A and B can, in addition, be substituted by alkyl or alkenyl groups optionally containing glycidylether groups and having at most 12 carbon atoms, or by halogen, and
d. the methylglycidyloxymethyl or glycidyloxymethyl groups are in the o- or p-position with respect to the etherified phenolic hydroxyl groups.

2. Methylolglycidyl ether according to claim 1, wherein R in formula I represents an alkylene group having 1 to 4 carbon atoms.

3. Methylolglycidyl ether according to claim 1 containing at least 3 glycidyl groups.

4. Methylolglycidyl ether according to claim 1, wherein R in formula I represents the 2,2-propylidene group, and the etherified phenolic groups are in the p-position with respect to R.

5. Methylolglycidyl ether according to claim 1, wherein R in formula I represents the sulphonyl group, and the etherified phenolic groups are in the p-position with respect to R.

6. Methylolglycidyl ether according to claim 1, wherein R in formula I represents the 1,1-prop-2-enylidene group, and the etherified phenolic groups are in the p-position with respect to R.

7. Methylolglycidyl ether according claim 1, wherein R' in formula I represents the methyl group.

8. Methylolglycidyl ether according claim 1, wherein R' in formula I represents the prop-2-enyl group.

9. Methylolglycidyl ether according claim 1, wherein R' in formula I represents the methoxyethyl group.

10. Methylolglycidyl ether according claim 1, wherein R' in formula I represents the glycidyloxyethyl group.

11. A Composition comprising a methylolglycidyl ether according to claim 1 and a sufficient amount of curing agent to cure said methlolglycidyl ether.

12. A composition according to claim 11 comprising the employment of cycloaliphatic or aliphatic polyamines as curing agents.

13. A composition according to claim 11 comprising the employment of mercapto compounds as curing agents.

14. A composition according to claim 11 comprising the employment of polyphenols as curing agents.

* * * * *

UNITED STATES PATENT AND TRADEMARK OFFICE
CERTIFICATE OF CORRECTION

PATENT NO. : 3,859,255
DATED : JANUARY 7, 1975
INVENTOR(S) : ALFRED HEER and ALFRED RENNER It is certified that error appears in the above-identified patent and that said Letters Patent are hereby corrected as shown below:

In the heading, please show:

Assignee: CIBA-GEIGY Corporation

Column 12, line 52, "glycidyloxylakyl" should read --- glycidyloxyalkyl ---.

Signed and Sealed this

Thirteenth Day of September 1977

[SEAL]

Attest:

RUTH C. MASON
Attesting Officer

LUTRELLE F. PARKER
Acting Commissioner of Patents and Trademarks